(12) United States Patent
Dees et al.

(10) Patent No.: US 9,445,449 B2
(45) Date of Patent: Sep. 13, 2016

(54) METHOD AND DEVICES FOR PAIRING WITHIN A GROUP OF WIRELESS DEVICES

(71) Applicant: KONINKLIJKE PHILIPS N.V., Eindhoven (NL)

(72) Inventors: Walter Dees, Eindhoven (NL); Johannes Arnoldus Cornelis Bernsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/423,312

(22) PCT Filed: Aug. 29, 2013

(86) PCT No.: PCT/EP2013/067868
§ 371 (c)(1),
(2) Date: Feb. 23, 2015

(87) PCT Pub. No.: WO2014/033199
PCT Pub. Date: Mar. 6, 2014

(65) Prior Publication Data
US 2015/0230280 A1 Aug. 13, 2015

Related U.S. Application Data

(60) Provisional application No. 61/695,022, filed on Aug. 30, 2012.

(30) Foreign Application Priority Data

Aug. 30, 2012 (EP) .................................... 12182285

(51) Int. Cl.
*H04W 76/02* (2009.01)
*H04L 29/06* (2006.01)
(Continued)

(52) U.S. Cl.
CPC .......... *H04W 76/023* (2013.01); *H04L 63/062* (2013.01); *H04L 63/065* (2013.01); *H04W 12/04* (2013.01); *H04W 84/12* (2013.01)

(58) Field of Classification Search
CPC .................................................. H04W 76/023
USPC ......................................... 455/39, 41.1–41.3
See application file for complete search history.

(56) References Cited

U.S. PATENT DOCUMENTS 6,965,816 B2 * 11/2005 Walker ............................ 701/16
8,892,874 B2 * 11/2014 Reznik et al. ................ 713/163
(Continued)

FOREIGN PATENT DOCUMENTS

WO    WO03056746 A1    7/2003

OTHER PUBLICATIONS

Wi-Fi Protected Access (WPA), Enhanced Security Implementation Based on IEEE P802.11i Standard, v 3.1, Aug. 2004, Wi-Fi Alliance www.wi-fi.org.
Bluetooth Specification, Core Package version 2.1 + EDR, issued: Jul. 26, 2007.
(Continued)

*Primary Examiner* — Tuan H Nguyen
(74) *Attorney, Agent, or Firm* — Larry Liberchuk

(57) ABSTRACT

System for wireless communication comprises a group of wireless devices (110,120,130,140) that include at least one wireless host device (100) securely connected based on first secret data (240) shared by the group. A second secure connection is set-up between a portable wireless device (200) and a wireless host device based on second secret data (250). At least one of the wireless devices is instructed to apply a third secret data for setting up a direct wireless secure connection with the portable wireless device (200). Also the portable wireless device is instructed via the second secure connection to apply the third secret data for setting up the direct secure connections with the wireless devices based on the third secret data. Finally a respective direct wireless secure connection is set-up between the second device and a respective wireless device based on the third secret data. Advantageously latency is reduced in a secure wireless docking system.

15 Claims, 4 Drawing Sheets

(51) Int. Cl.
*H04W 12/04* (2009.01)
*H04W 84/12* (2009.01)

(56) References Cited

U.S. PATENT DOCUMENTS

2005/0152294 A1  7/2005  Yu
2010/0153727 A1  6/2010  Reznik
2011/0188391 A1  8/2011  Sella
2012/0106475 A1  5/2012  Jung

OTHER PUBLICATIONS

IEEE EEE Std 802.11z-2010 Part 11: "Wireless LAN Medium Access Control (MAC) and Physical Layer (PHY) Specifications", Amendment 7: Extensions to Direct-Link Setup (DLS), published by IEEE on Oct. 14, 2010.
Wireless Docking Contortion Technical Committee Wireless Docking task Group, Wireless Docking Requirements Specification, v 0.12, Jun. 20, 2012.
Trifunovic S. et al., "WiFi-Opp: Ad-Hoc-less Opportunistic Networking", CHANTS'11, Sep. 23, 2011, Las Vegas, Nevada, USA.

* cited by examiner

METHOD AND DEVICES FOR PAIRING WITHIN A GROUP OF WIRELESS DEVICES

FIELD OF THE INVENTION

The invention relates to a system for wireless communication comprising a group of wireless devices and a portable device, each device comprising a radio transceiver for wirelessly exchanging data with the other devices,
a first wireless device of the group accommodating a first host function and a second wireless device of the group accommodating a second host function, the first and second wireless devices being the same wireless device or different wireless devices;
the group of wireless devices sharing first secret data and configured for wireless communication to the first wireless device accommodating the first host function via respective first secure connections based on the first secret data.

The invention further relates to portable device, a host device, a wireless device, a method and a computer program product for use in the above system for wireless communication.

The invention relates to the field of secure wireless communication, e.g. via Wi-Fi, and more specific to a secure setup for a wireless docking system.

BACKGROUND OF THE INVENTION

In wireless communication, such as Wi-Fi known from the IEEE 802.11 documents, devices need to be paired in order to set up a secure connection, for examples as described in the document "Wi-Fi Protected Access (WPA), Enhanced Security Implementation Based on IEEE P802.11i standard, Version 3.1, August, 2004, by the Wi-Fi Alliance" available via www.wi-fi.org. Although the invention is further elucidated using the Wi-Fi system, it is noted that the invention may similarly be applied in other wireless communication systems, such as Bluetooth (see e.g. BLUETOOTH SPECIFICATION, Core Package version 2.1+ EDR, issued: 26 Jul. 2007).

Wi-Fi connections are protected for confidentiality and integrity by cryptographic means, using technologies such as WPA2. The security in WPA2 can be based on two systems. The first one is Pre-Shared Key mode (PSK, also known as Personal mode) and is designed for home and small office networks. The second one relies on the use of an 802.1X authentication server and is designed for enterprise networks.

In PSK mode, all devices that communicate with each other share a 256 bit key, which is also called the 'Passphrase'. Wi-Fi Simple Configuration (a.k.a. Wi-Fi Protected set-up), known from the document "Wi-Fi Simple Configuration, Technical Specification, Version 2.0.2, 2011", also from the Wi-Fi Alliance, is a standard that allows a first device that knows the Passphrase, e.g. a Wireless LAN Access Point, to send it to a second device in a secure way, without the user having to enter the Passphrase in the second device. Instead, the user may for example push a button on both devices within a limited time, or enter an 8-digit PIN that is listed on the first device in the second device, in order to receive a passphrase. This typically involves a user action, i.e. a so-called user pairing action.

US2010/0153727 describes enhanced security for direct link communications between multiple wireless devices, which exchange nonces that are used for generating a common nonce. A group identification information element is generated from at least the common nonce and is forwarded to an authentication server. The authentication server generates a group direct link master key from the group identification information element to match devices as part of a key agreement group. Group keys are also generated based on the common nonce. So a secure group of devices for direct link communication is created.

SUMMARY OF THE INVENTION

In the Wi-Fi Infrastructure, an Access Point (AP), or rather its Registrar, stores and manages the credentials for the network it is responsible for. A Wi-Fi device that wishes access to the Wi-Fi Infrastructure network of an AP needs to obtain the network credentials in a pairing operation with the AP. Once the secure connection with the AP is set up, the Wi-Fi device can communicate with other Wi-Fi devices associated with the AP. The traditional infrastructure has the disadvantage that connections are indirect, because all communication needs to pass through the access point. In many cases however, it is beneficial (e.g. for reducing latency, improving the connection speed) that devices would be able to set up a direct link between each other without having to relay the traffic through the access point. Two technologies Wi-Fi Direct and Tunnelled Direct Link Setup (TDLS) have been created to be able to set up such direct Wi-Fi link between devices.

Wi-Fi Direct (a.k.a. Wi-Fi Peer to Peer), known from the document "Wi-Fi Wi-Fi Peer-to-Peer (P2P) Technical Specification, Version 1.1, 2010", also from the Wi-Fi Alliance is a standard that allows Wi-Fi devices to connect to each other with no need for a wireless access point. Wi-Fi Direct plays an important role for connecting standalone wireless devices and peripherals, such as display devices/peripherals supporting Wi-Fi Display, and I/O devices/peripherals supporting Wi-Fi Serial Bus (e.g. wireless mouse, keyboard, printer, USB hub). It is therefore an important technology for wireless docking, a technology to enable a portable device to connect to a multitude of wireless peripherals. In Wi-Fi Direct, a user pairing step typically needs to be performed for every new Wi-Fi Direct connection that is created. When two Wi-Fi Direct devices want to communicate, one of them becomes the so-called Group Owner (GO). The other device takes the client role. Together they form a so-called P2P group. A GO has many similarities with an AP. It may for example allow other devices to join the P2P group, and offer possibilities to distribute traffic between the different devices in the P2P group. However, as mentioned before, it is beneficial that devices would be able to communicate directly with each other without having to relay traffic. In case of Wi-Fi Direct this would mean that you would have to connect to and pair with each of the other devices individually. This is cumbersome, especially if multiple devices are involved. For example, for wireless docking of a portable device with a multitude of wireless peripherals, it would be very user unfriendly if the user would need to perform a user pairing step with each wireless peripheral individually. It is therefore very important to keep the amount of pairing actions to a minimum.

Tunnelled Direct Link Setup (TDLS), known from the document "IEEE Std 802.11z-2010 Part 11: Wireless LAN Medium Access Control (MAC) and Physical Layer (PHY) specifications, Amendment 7: Extensions to Direct-Link Setup (DLS), published by IEEE on 14 Oct. 2010", is a option in Wi-Fi that enables setting up a direct link between two devices that are both connected to the same Wi-Fi Access Point, without needing to pair again to set up a secure direct connection. This is done as follows. Once a TDLS enabled Wi-Fi Device is connected to the AP, it can send a request to another TDLS enabled device that is connected to the same AP to set up a direct connection. After exchanging information such as the security credentials and information about which Wi-Fi channel to use, the two devices can start a private secure direct link between the two devices.

However, TDLS has several drawbacks:

All devices involved must support concurrent operation (to maintain a direct link to the other device and a link to the AP simultaneously, including operating on two different frequencies), whereas many portable and wireless peripheral devices are only able to set up and maintain a single Wi-Fi connection and/or single frequency Wi-Fi connections.

TDLS has several compatibility problems when used in a Wi-Fi Direct network (e.g. TDLS through the Wi-Fi Direct GO to set up a direct link between different devices within a Wi-Fi Direct P2P group). For example, the power save mechanisms of Wi-Fi Direct and TDLS are not compatible and can cause conflicts.

The exchange of security credentials for the TDLS direct link is done through a TDLS Peer Key (TPK) Handshake. The problem is that this handshake between the two TDLS devices is done via the AP. Since the AP can decrypt the messages of the TDLS devices involved, it means that the AP can overhear this handshake, and is able to recover the key that TDLS devices agree on for the direct connection. When PSK mode is used, also other devices associated with the same AP will be able to overhear this traffic, for example in the following manner: when a Wi-Fi device associates with an AP using PSK, it uses the Passphrase and other information in a so-called Four-Way Handshake to generate/derive a link key called Pairwise Transient Key (PTK). The PTK is used for the encryption and authentication of the traffic between that Wi-Fi device and the AP. Traffic meant for another device is re-encrypted by the AP with the link key (PTK) that the AP and the other device have derived from the Passphrase. Although the AP has a different PTK for each associated Wi-Fi device, any device associated with the AP, in possession of the Passphrase, can compute the PTK that is used by listening into the Four-Way Handshake between the other device and the AP. Since by using this PTK the device can decrypt the communication between the other device and the AP, this means that it can also overhear the TDLS Peer Key Handshake, and compute the key that is used to protect the TDLS direct link between the two TDLS devices. Hence, TDLS by default does not provide secure private communication over the direct link.

The pairing of a wireless device and the connection setup always has to go through the access point to which all devices in the group must be connected. You cannot directly connect with any of the clients/stations (e.g. the display) in the group unless you first set up a connection with the access point/group owner. This means that you may need to be physically close to the access point/group owner to perform the pairing steps, since you are not able to connect with the group through one of the other devices in the group.

It is an object of the invention to provide a system for secure communication that keeps the number of user pairing steps to a minimum, prevents eavesdropping of the direct links between devices, and provides flexibility in connecting to the group.

For this purpose, in the system for wireless communication as described in the opening paragraph, the portable device comprises a device communication processor for setting up a second secure connection with the second wireless device accommodating the second host function using a pairing procedure based on second secret data different from the first secret data, receiving a second instruction via the second secure connection, and, according to the second instruction, setting up a respective direct wireless secure connection with at least one wireless device of the group using a respective pairing procedure based on third secret data, the third secret data differing from the first secret data;

the second wireless device accommodating the second host function comprises a host communication processor for setting up the second secure connection with the portable device using the pairing procedure based on the second secret data, transferring to the at least one wireless device via the first secure connection a first instruction to apply the third secret data for setting up a direct wireless secure connection with the portable device, and transferring to the portable device via the second secure connection a second instruction to apply the third secret data for setting up the direct wireless secure connection with the at least one wireless device based on the third secret data;

the at least one wireless device comprises a communication processor for receiving the first instruction via the first secure connection, and, according to the first instruction, setting up the respective direct wireless secure connection with the portable device using a respective pairing procedure based on the third secret data.

For this purpose, according to a further aspect of the invention, the method of wireless communication in the system of wireless devices as described in the opening paragraph comprises setting up a second secure connection between the portable device and the second wireless device accommodating the second host function using a pairing procedure based on second secret data different from the first secret data;

transferring to at least one wireless device of the group via the first secure connection a first instruction to apply a third secret data for setting up a direct wireless secure connection with the portable device, the third secret data differing from the first secret data (240), and transferring to the portable device via the second secure connection a second instruction to apply the third secret data for setting up the direct wireless secure connection with the at least one wireless device based on the third secret data;

setting up a respective direct wireless secure connection between the portable device and the at least one wireless device using a respective pairing procedure based on the third secret data.

The main elements of the secure system and method enable a portable device A (e.g. Wi-Fi Direct compatible) to connect to a group G of wireless devices. The group G is preconfigured to act as a group connected to a wireless device accommodating a first host function and shares a common secret S1 used for securing the communication within the group. The group may for example comprise a wireless docking host and wireless peripherals. The device A connects to one of the wireless devices, which functions as a second host device by accommodating a second host function, in the group using secret S2 for securing the communication via the second secure connection. Subsequently, the devices in the group and device A get instructed about another secret S3, followed by device A to start listening for incoming connections, followed by one or more devices setting up a direct secure wireless connection with device A using the secret S3 for automated pairing with device A, e.g. in a manner that is compatible with Wi-Fi Direct. Optionally, the second host device is the same device as the wireless device accommodating the first host function. Hence the first and second host function may be implemented in a single wireless device. Furthermore, group G may contain devices that are only capable of supporting a P2P Client or a Wi-Fi station (STA) role, and not a P2P Group owner or Wi-Fi Access Point (AP) role.

The measures have the effect that a wireless secure communication system and secure protocol are provided for distributing the secrets used for setting up secure direct links with minimal user pairing steps, in a manner that prevents eavesdropping of the direct links between devices, and which in addition offers extra flexibility by allowing any device capable of performing the function of the second host to be the entry point to the group of wireless devices performing a function. For example, the group of devices may provide a docking environment for a portable device like a smart phone (a.k.a. dockee). In particular the dockee does not always have to use the same device in the docking system (e.g. an AP or GO) for connecting with the group, but instead may connect to any device in the group accommodating said second host function.

The invention is also based on the following recognition (using the Wi-Fi environment as an example). When a group of Wi-Fi Direct devices together perform functions for another wireless device (such as wireless docking), it is desirable that the other wireless device is able to set up one or more peer-to-peer links with any of the wireless devices in the group without having to perform a user pairing action with each of these devices from the group individually.

Wi-Fi Direct has the concept of a group owner (GO). If all the Wi-Fi Direct devices in the group would connect to the same GO, and the GO supports the so-called Intra-BSS distribution feature of Wi-Fi Direct, then it is sufficient for the other wireless device to connect to this GO to be able to communicate with all the devices in the group. An Intra-BSS Distribution field indicates if the P2P Device is hosting, or intends to host, a P2P Group that provides a data distribution service between Clients in the P2P Group. However, all communication would have to go through the GO. This is very inefficient, and increases the latency of the communication. For functions such as wireless docking, latency is an important issue. The connection with the wireless display, mouse, keyboard etc. needs to be as low latency as possible. Therefore it is important to be able to set up direct (i.e. peer-to-peer) connections with multiple or even all members of the group. However, that would require multiple user pairing steps to be performed for every wireless dockee that would want to connect to this group of peripherals. For reasons mentioned in the previous section, using TDLS is not an option to overcome this problem.

Another problem is that Wi-Fi Direct imposes certain restrictions on devices, such as the restriction that a P2P device can only be connected to a single GO. Once connected to a GO the P2P Device changes roles, i.e. the device becomes a P2P client. Wi-Fi Direct defines various restrictions for P2P Clients, such as restrictions on discoverability and communicating between P2P clients. Furthermore, the number of simultaneous P2P client instances that can typically run on a single device is also very limited. Many low-end wireless peripherals (such as a Wi-Fi mouse or keyboard) are expected to even have further restrictions due to their resource limitations, such as supporting only the P2P Client role and supporting only a single Wi-Fi link.

The inventors have seen that the above problems are overcome by the secure protocol that generates, via the second host, the third secret data and instructs the portable device (dockee) and wireless devices of the group to apply the third secret data for connecting the first device to the selected wireless devices of the group, e.g. constituting a preconfigured docking environment.

Optionally, in the portable device, the device communication processor is further arranged for controlling the communication via said direct wireless connections as a group owner. In general in a wireless network system a device may control a group of devices as a group owner, for example in WLAN executing the AP role. In an example in Wi-Fi, the first device takes a Wi-Fi Direct group owner role when setting up Wi-Fi Direct P2P connections between the devices in a subset G' of further wireless devices and first device.

Optionally, in the portable device, the device communication processor is further arranged for setting up respective different direct wireless secure connections with respective wireless devices of respective different subsets using a respective pairing procedure based on respective different third secret data. Advantageously, multiple subsets are accommodated to communicate with the first device via different instances of the third secret data.

Optionally, in the portable device, the device communication processor is further arranged for receiving the second instruction including respective different third secret data for multiple subsets. Advantageously, multiple subsets are accommodated to communicate with the portable device via a single instruction.

Optionally, in the portable device, the device communication processor is further arranged for generating the third secret data and transferring the third secret data to the device accommodating the second host function. Advantageously, the portable device controls security by controlling the generation of the third secret data.

Optionally, in the portable device, the device communication processor is arranged for disconnecting the second secure connection before initiating setting up the respective direct wireless secure connection with a respective wireless device of the subset. Advantageously, less radio transceiver capability is required and less capacity of the wireless medium is used.

Optionally, in the portable device, the device communication processor is arranged for providing a persistent grouping, and accordingly for, after disconnecting the respective direct wireless secure connection based on said third secret data, setting up a further respective direct wireless secure connection based again on said third secret data. Advantageously, when a portable device, e.g. a dockee, reconnects, the secure communication is restored faster.

Optionally, in the portable device, the device communication processor is arranged for using the second secret data or the third secret data acquired during earlier pairing when, after disconnecting the respective direct wireless secure connection based on said third secret data, reconnecting with the respective wireless device of the subset for setting up a respective direct wireless secure connection. Advantageously, when a portable device, e.g. a dockee, reconnects, the secure communication is restored faster.

Optionally, the second secure connection comprises a Wi-Fi Direct P2P connection. In practice, the connection may be a Wi-Fi Direct P2P connection and where the second secret data (S2) is a Wi-Fi Passphrase, e.g. the Wi-Fi Pairwise Master Key (PMK) or the Wi-Fi Pre-shared key (PSK).

Optionally, the respective direct wireless secure connection comprises a Wi-Fi Direct Peer to Peer connection, and/or the respective direct wireless secure connection comprises a Tunneled Direct Link Setup (TDLS) connection. In practice, the direct connections between the devices in subset G' and the first device may be Wi-Fi Direct P2P connections and where the third secret data is a Wi-Fi Passphrase, e.g. the Wi-Fi Pairwise Master Key (PMK) or the Wi-Fi Pre-shared key (PSK). Alternatively, the direct connections between the devices in subset G' and the first device are TDLS connections. Furthermore, the pairing procedure may comprise a Wi-Fi Protected Access (WPA/WPA2) or Wi-Fi Simple Configuration procedure. Advantageously, such known pairing procedure may already be available in the wireless device, and may be shared.

Optionally, a pre-configuration step involves designating device the device accommodating the second host function to be a Wi-Fi Direct P2P Group Owner of a P2P group consisting of the second host device and the devices in group G, and pairing each of the devices in group with the second host device to get the common secret S1 from the second host device and where S1 is the Passphrase (the Wi-Fi Pairwise Master Key (PMK) or the Wi-Fi Pre-shared key (PSK).

Optionally, in the host device, the host communication processor is arranged for generating the third secret data. Advantageously, the host device controls security by controlling the generation of the third secret data.

Optionally, in the host device, the host communication processor is arranged for generating a respective, different set of the third secret data for respective, different instances of the first device. Advantageously, overhearing of communication is prevented among different first devices.

Optionally, in the host device, the host communication processor is arranged for generating a respective, different set of the third secret data when the device (A), after having disconnected the second secure connection, is setting up the second secure connection a respective, further time. Advantageously, replay attacks are avoided by generating different sets of third secret data.

Optionally, in the host device, the host communication processor is arranged for generating a respective, different set of the third secret data for a respective, different subset of the wireless devices in the group. Advantageously, multiple subsets are accommodated to communicate with the first device via different instances of the third secret data.

Optionally, in the host device, the host communication processor is arranged for generating the third secret data based on, or equal to, the second secret data. Basically, the third secret data may be chosen to be different of the second secret data, which enhances security. Advantageously, the third secret data may be generated based on the second secret data, which enhances efficiency. Also, the third secret data may be chosen to be equal to the second secret data, which enhances speed as less data needs to be transferred.

Optionally, in the host device, the host communication processor is arranged for assigning a limited lifetime to the third secret data, and/or assigning a lifetime to the third secret data depending on an authorization level of the device (A). Advantageously, access to the secure system is limited in time, or a guest or owner may be assigned different rights.

Optionally, in the host device, the host communication processor is arranged for transferring a third instruction to the respective wireless device of the subset for disconnecting the first secure connection before setting up the respective direct wireless secure connection to the device. Advantageously, less radio transceiver capability is required and less capacity of the wireless medium is used.

Optionally, the host device is a wireless docking host or a wireless docking station. In practice, the host device may be the same device as the first wireless host device and/or the second wireless host device. Hence the first and second host function may be implemented in a single docking host or wireless docking station.

Optionally, in the wireless device, the respective communication processor is arranged for initiating the setting up of the respective direct wireless secure connection to the portable device. Advantageously, the wireless device controls the setting up.

Optionally, in the wireless device, the respective communication processor is arranged for disconnecting the first secure connection before setting up the respective direct wireless secure connection to the portable device. Advantageously, less radio transceiver capability is required and less capacity of the wireless medium is used.

Optionally, in the wireless device, the respective communication processor is arranged for restoring the first secure connection after disconnecting the respective direct wireless secure connection to the portable device. Advantageously, the preconfigured group is automatically reconnected after the first device has been disconnected.

Optionally, the host device is capable of being part of two independent Wi-Fi Direct P2P groups, one group consisting of the devices in group G, and one consisting of the portable device having a P2P connection with the host device.

Optionally, the host device informs other devices in the group G of the secret S3 before portable device A connects. Advantageously, the connection of the portable device to the group, e.g. the docking procedure, is accomplished faster.

Optionally, the host device supports Wi-Fi Direct Persistent Group operation. Optionally, the host device invites the devices in group G to connect to the host device using the Wi-Fi Direct P2P Invitation procedure. Optionally, the automated pairing procedure is based on Wi-Fi Protected Access (e.g. WPA or WPA2). Optionally, the automated pairing procedure is based on Wi-Fi Simple Configuration. Optionally, the portable device supports Wi-Fi Direct intra-BSS distribution so that the wireless devices in the group G can still communicate with each other to perform a function together, without requiring a backbone. Optionally, the portable device supports Wi-Fi Direct Persistent Grouping operation, and uses the third secret data retrieved during a first connection with the group through the second host device to connect to the devices of subset G' in a subsequent connection. Advantageously, such options are extensions of existing elements of Wi-Fi enabled devices.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

A detailed implementation example for a wireless docking system is discussed now. Wireless docking is about enabling portable devices (so called wireless dockees or WDs) to wirelessly connect to a group of wireless peripherals, so that applications on the portable device can make use of these peripherals to improve the experience and productivity of working/interacting with these applications. The grouping of peripherals, the discovery of groups of peripherals, managing the connections to groups of peripherals, is performed by a so-called wireless docking host (WDH).

Possible wireless dockees include (but are not limited to) mobile phones, laptops, tablets, portable media players, cameras. Possible WDHs include (but are not limited to) dedicated wireless docking station devices, display devices, audio devices, printers, PCs. Possible peripherals include (but are not limited to) wireless mice, keyboards, display devices, audio devices, webcams, printers, storage devices, USB hubs. These peripherals are considered to support standards such as Wi-Fi Serial Bus and Wi-Fi Display to make their functionality available through the wireless network to other devices such as dockees and WDHs. Wired peripherals may be connected to the wireless network by connecting them to a intermediate device via wires, and the intermediate device being wirelessly connectable as defined in this document, e.g. a USB Hub device which supports Wi-Fi Serial Bus. Peripherals and dockees can also be WDHs by themselves.

Figure 1:
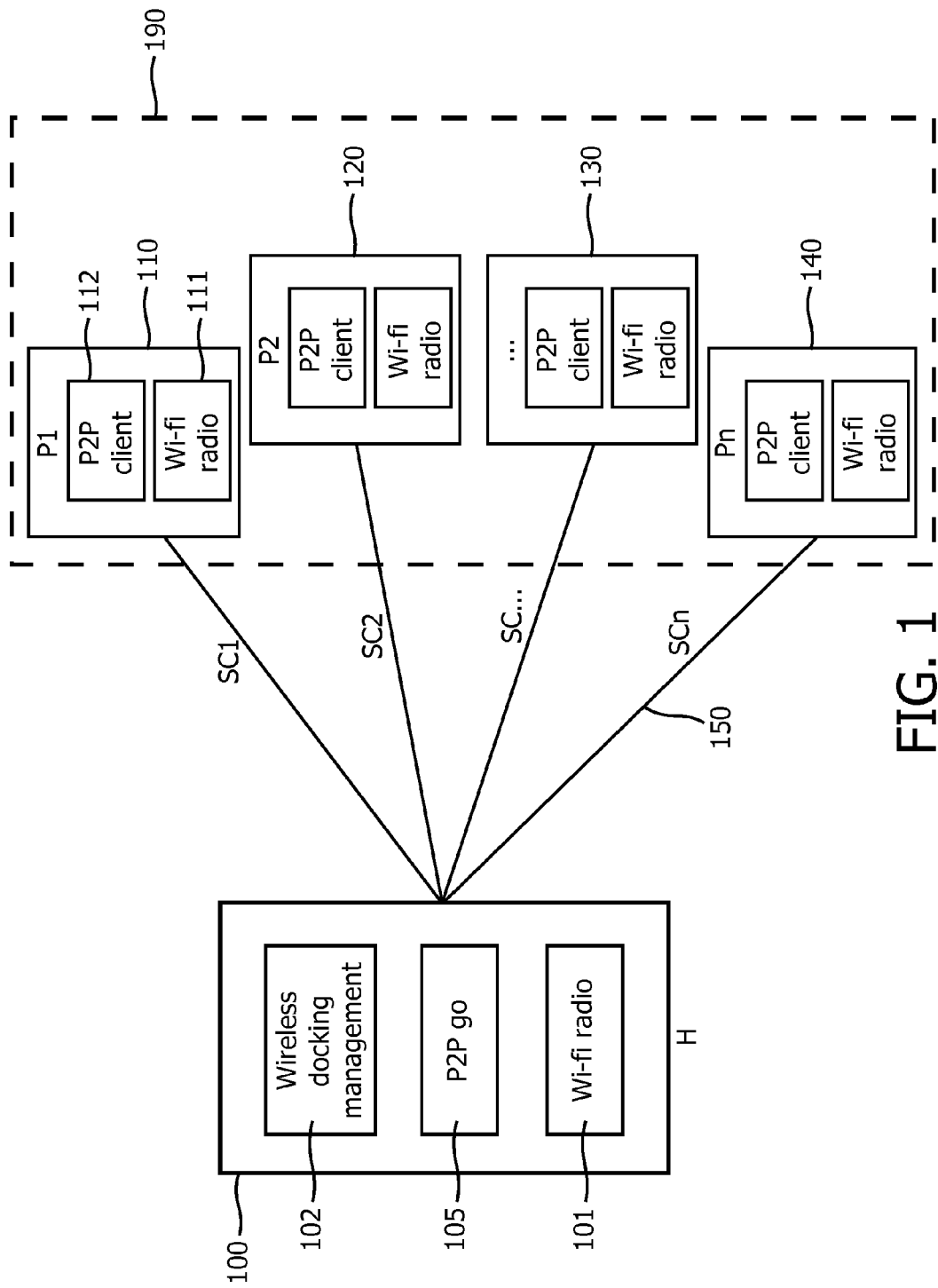
FIG. 1 shows a wireless docking system during pre-configuration.

FIG. 1 shows a wireless docking system during pre-configuration. The wireless docking system has a wireless docking host device H 100, and several wireless peripheral devices P1 . . . Pn 110, 120, 130, 140. The devices all have a Wi-Fi radio transceiver 101, 111 and support participating in a Wi-Fi Direct P2P group. Some peripheral devices may be restricted to only support acting as a P2P Client or a legacy client.

FIG. 1 illustrates an initial situation of pre-configuring a set of peripherals for wireless docking. The peripheral devices form a group 190 of wireless devices that are connected to a host device H 100 through Wi-Fi Direct connections 150 SC1 . . . SCn, which acts as group owner (P2P GO) of the P2P group formed by H and the peripherals P1 . . . Pn acting as P2P Clients. Thereto the wireless devices have a respective communication processor 112, shown as having the function of the P2P Client. In practice the communication processor of such wireless devices and/or host devices is known as such and may be implemented in a dedicated integrated circuit, in a programmable circuit and/or in firmware that is executed on a microcontroller or dedicated processor. The communication processors are arranged to execute the communication process as explained below.

Setting up Wi-Fi Direct connections SC1 . . . SCn requires a pairing step, e.g. using Wi-Fi Simple Configuration (WSC). During the pairing step, a common secret S1 is provided by H to establish a secure connection based on Wi-Fi Protected Access (WPA/WPA2). The secret S1 may be the Passphrase (the Wi-Fi Pairwise Master Key (PMK) or the Wi-Fi Pre-shared key (PSK), which is used in the four-way handshake to set-up Wi-Fi Protected Access (WPA/WPA2).

There are many possibilities to distribute the secret S1, e.g. secret S1 may be distributed using Wi-Fi Simple Configuration or secret S1 may be pre-configured in all relevant devices. Wireless docking host device H also has a host communication processor 102 (also called Wireless Docking management) in order to store the information about peripherals, keep track of the connections, establish secrets, instruct other devices, configuring which peripherals together form a wireless docking environment.

Figure 2:
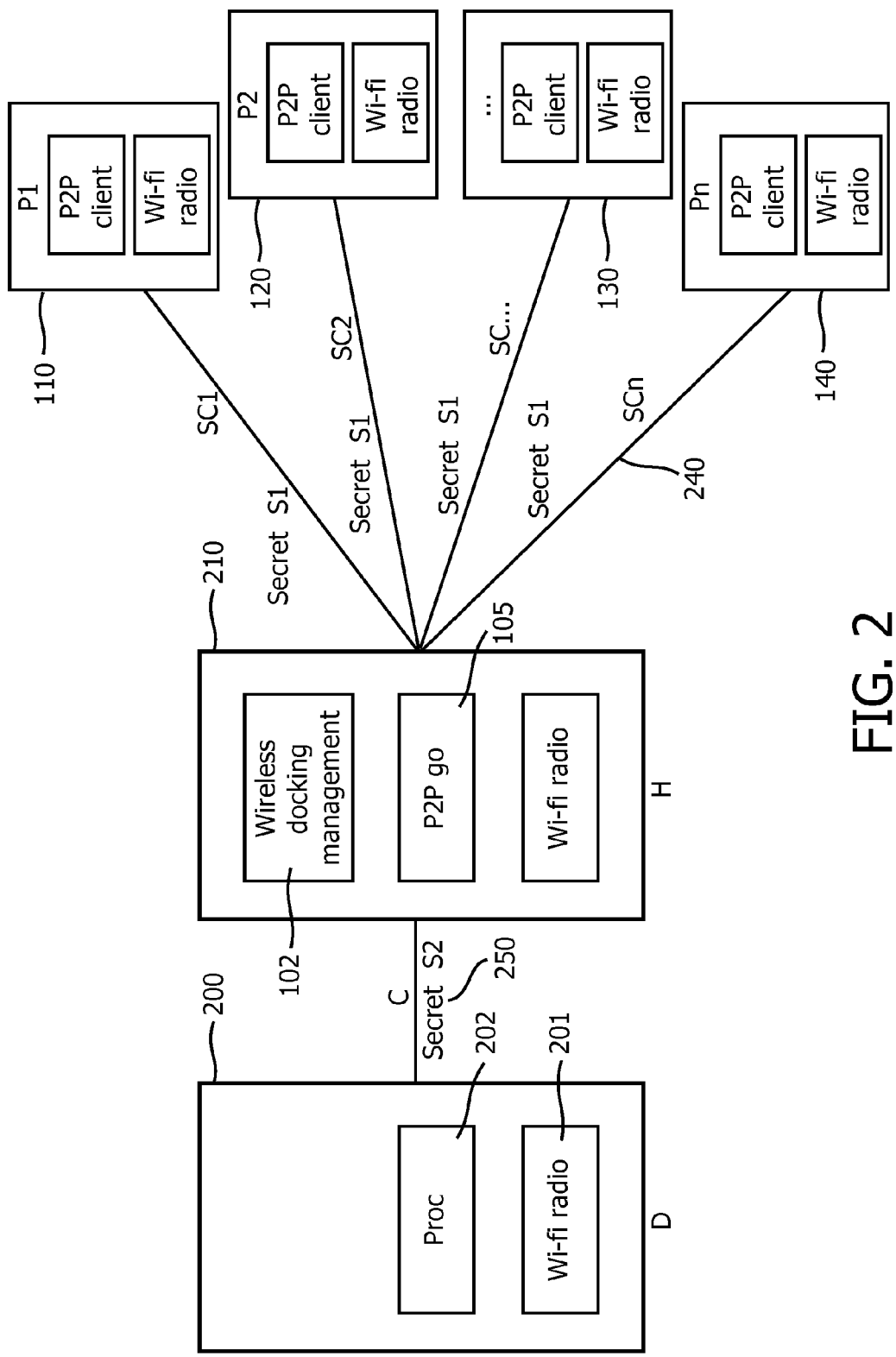
FIG. 2 shows a wireless device establishing a connection to a host.

FIG. 2 shows a wireless device establishing a connection to a host. The wireless device 200 is called a dockee D and is shown in a wireless docking system similar to FIG. 1 above. The wireless device has a Wi-Fi radio transceiver 201 and a communication processor PROC 202 for controlling the communication process.

In the system the wireless dockee D establishes a Wi-Fi Direct connection C 250 with a wireless docking host H 210 in order to dock with a set of peripherals. This particular implementation example only shows the solution whereby the dockee sets up an initial docking connection (so-called pilot connection) to the wireless docking host H and not to any of the devices P1 . . . Pn. It is noted that, similarly, the dockee may set up the initial connection to any of one the further wireless devices P1 . . . Pn, when such wireless device is arranged to perform the host function for setting up the initial connection. Hence the host functions may be performed by a single device, or may be distributed among different devices.

During the pairing step between D and H in order to set up connection C, H makes sure that for safety reasons a secret S2 unequal to S1 is provided by H to establish a secure connection based on Wi-Fi Protected Access (WPA/WPA2). Similar to connection SC1 . . . SCn based on secret data S1 as indicated by connection lines 240, the secret S2 is the Passphrase (the Wi-Fi Pairwise Master Key (PMK) or the Wi-Fi Pre-shared key (PSK), which is used in the four-way handshake to set-up Wi-Fi Protected Access (WPA/WPA2). There are many possibilities to distribute the secret S2, e.g. secret S2 may be distributed using Wi-Fi Simple Configuration or secret S2 may be pre-configured in all relevant devices. In this implementation example, D connects to H's P2P GO, whereby D automatically becomes P2P Client. Alternatively, D and H form a new P2P group, independent from the P2P group established between H and the peripherals, whereby either D or H can become P2P GO.

Figure 3:
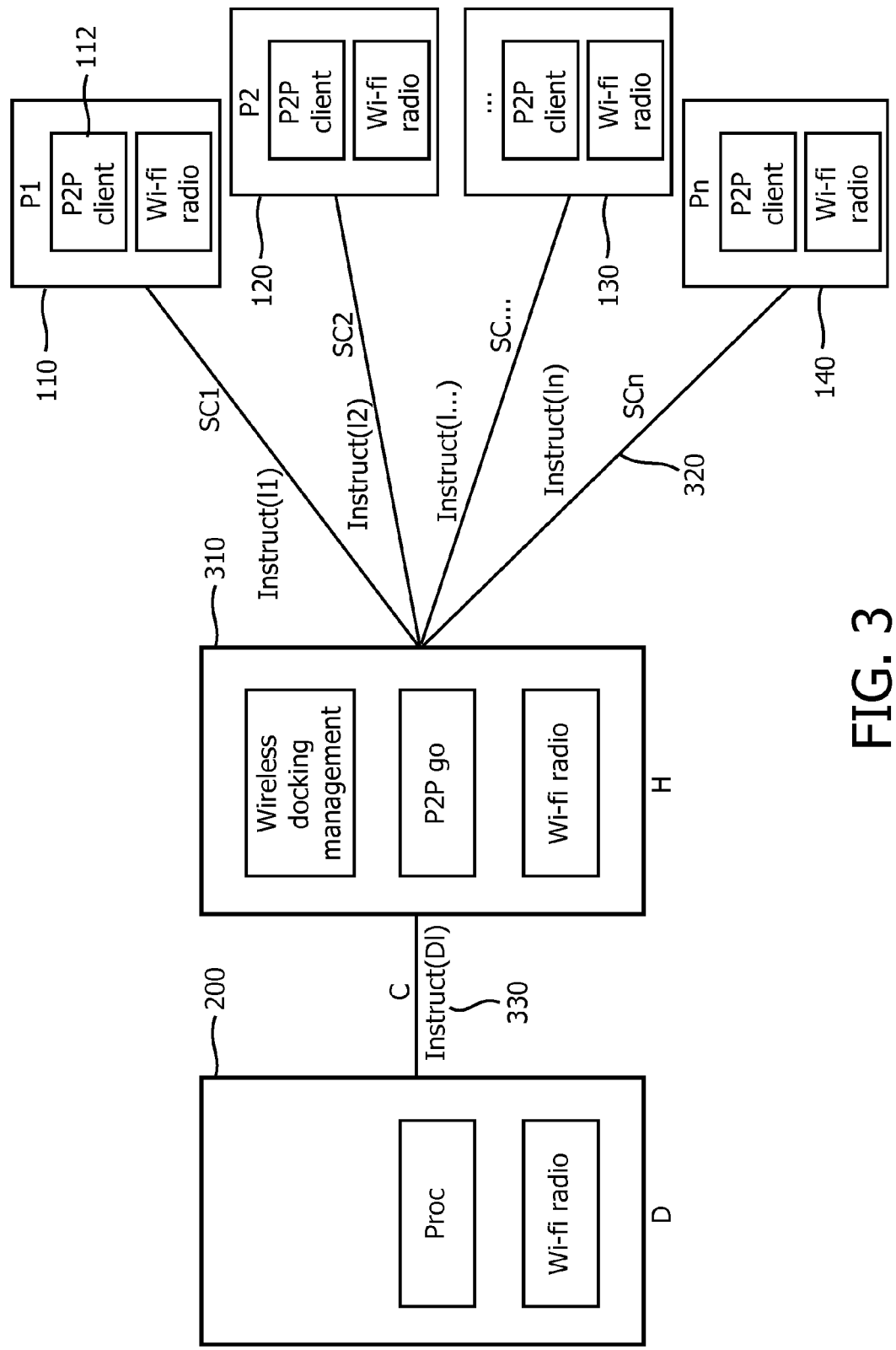
FIG. 3 shows a wireless host instructing connected wireless devices.

FIG. 3 shows a wireless host instructing connected wireless devices. A wireless host H 310 is shown in the wireless docking system similar to FIG. 1 and FIG. 2 above. The Figure illustrates the dockee D 200 and peripherals P1 . . . Pn 110,120 receiving instructions from the wireless docking host H 310.

The figure shows that H instructs one or more peripherals through instructions I1 . . . In 320, and also the dockee through instruction DI 330, about using secret S3 during an automated pairing step between the peripherals and D. These instructions and messaging can take any format using many different communication protocols, ranging from binary encoded instructions in MAC frames to XML encoded instructions over HTTP.

In addition to secret data S3, the instructions may also include information about which actions that the devices need to perform after receiving them, such as breaking the connection with H and setting up a connection with D. The peripherals may need to be provided with information about the Service Set Identifier SSID that D will use for advertising its Wi-Fi Direct capabilities, and D may need to be provided with information such as unique identifiers of the peripherals that will establish a connection. One or more peripheral device Pi may also remain connected to H. These devices may receive an instruction to remain connected to H, or to disconnect from H. In FIG. 3, it is assumed that devices P3 . . . Pn-1 receive an instruction to remain connected to H.

Using the channel C, protected by a key derived from secret data S2, the secret data S3 is also sent to the dockee D. This means that D and the one or more peripherals can set-up WPA/WPA2 protected connections directly using the four-way handshake and that the execution of a Wi-Fi Simple Configuration procedure, involving possible user interaction to enter PIN codes, is not required. Not having to execute the Wi-Fi Simple Configuration procedure also speeds up the docking procedure.

Figure 4:
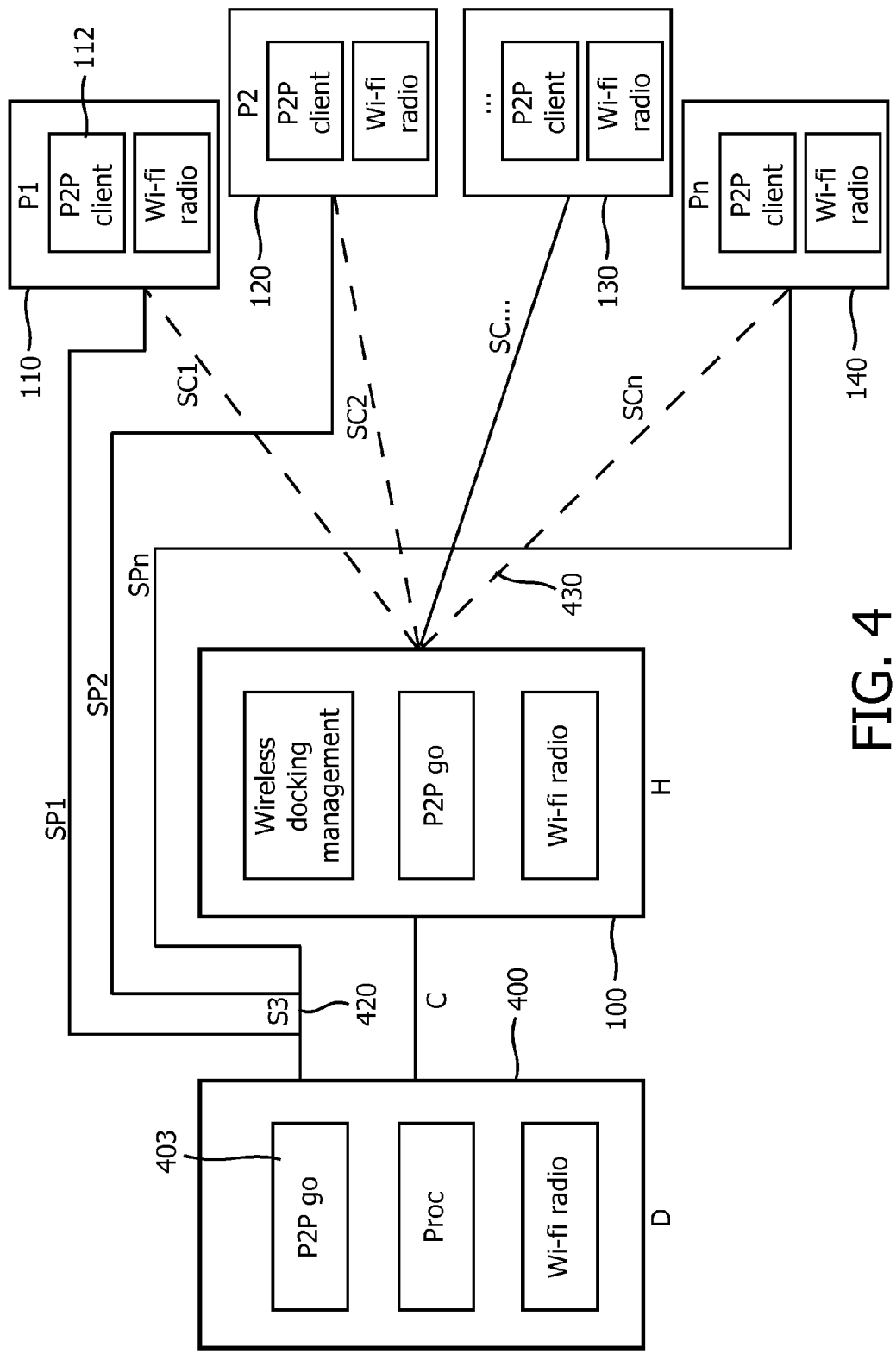
FIG. 4 shows a wireless device directly connected further wireless devices.

FIG. 4 shows a wireless device directly connected further wireless devices. A wireless device D 400 is shown in the wireless docking system similar to FIGS. 1, 2 and 3 above. The Figure illustrates the dockee D 400 and a subset, e.g. three peripherals 110,120,140, of the peripherals P1 . . . Pn being directly connected, and optionally disconnected indicated by dashed lines 430 from the wireless docking host H 100. In the Figure one peripheral 130 is not connected to the dockee D and remains only connected to the wireless docking host 100.

The figure shows the situation where devices P1, P2 and Pn have set-up direct connections SP1, SP2 and SPn with dockee device D, using secret data S3 (pass phrase S3) indicated by 420. D acts as a Wi-Fi Direct Group owner (indicated by P2P GO unit 403 in the Figure) for SD1, SD2 and SDn. The connections SC1, SC2 and SCn with H may be released or may stay active. The dotted lines in FIG. 4 reflect that. The docking involves the Dockee D changing roles and becoming a P2P GO for the subset of wireless peripherals. During the WPA/WPA2 four-way handshake, S3 may be used as a common secret (Wi-Fi Pairwise Master Key (PMK) or the Wi-Fi Pre-shared key (PSK)) to derive the link key (Pairwise Transient Key). Alternatively, S3 is used in the Wi-Fi Protected Setup pairing procedure, where instead of the user entering e.g. a PIN code, the PIN is derived from S3.

In practice the above wireless docking system may be applied to connect a wireless dockee D directly to a display device or a (USB) mouse/keyboard for reducing latency. The devices may be instructed to use a predefined configuration set. Disconnected devices may go to sleep. Optionally, the wireless host may instruct them to wake up at a particular regular interval to be able to discover them and connect with them again.

In an example system a wireless peripheral device P (e.g. a Wi-Fi-display) may be initially connected to a wireless host H via a secure channel C based on a link key (Pairwise Transient Key) based on a Pass Phrase S1. The host acts as Group Owner (GO) and P acts as client. H and P both support Wi-Fi Direct Persistent P2P grouping. Thereto P stores Pass Phrase S1 in its memory. Dockee D initially connects with host H via Wi-Fi direct over a secure channel D with a link key (Pairwise Transient Key) which is based on Pass Phrase S2. Via a docking configuration protocol H instructs dockee D that a payload connection over Wi-Fi must be accepted. The connection directly with peripheral P is effected via a Group Owner unit at D, while using a Pass Phrase S3 to generate a link key (Pairwise Transient Key) M as agreed with peripheral P. H also instructs P that it must connect to peripheral D's GO while using the link key (Pairwise Transient Key) M as agreed with D. Hereafter P may disconnect the connection with H and sets up a link with D with link key (Pairwise Transient Key) M. If the connection is broken between P and D (e.g. if D undocks), then P may reconnect to H using the original Pass Phrase S1.

In a practical embodiment the enhanced wireless docking system as described above may be implemented as follows. In the example wireless docking system there is one wireless host WDH through which a wireless device WD can dock. The WDH is connected to peripherals PF through wired and wireless interfaces and may also have built-in PFs. It is further assumed that some of the wireless PFs have extra functionality built-in so that they can be instructed to connect directly to a docked WD, or are equipped to perform the wireless host functions.

The following advantages are achieved by the enhanced wireless docking system. PFs can be quickly connected to a WD (no need to execute the Wi-Fi Simple Configuration WSC protocol), and without user intervention. A WD that is only allowed to dock once is, after undocking, not enabled anymore to connect automatically again with the PFs or WDH it was docked with. The Wi-Fi communication between a WD and the WDH it is docked with is protected for privacy and integrity. Also other WDs that may have previously docked with that WDH cannot decrypt this communication or tamper with it without detection. The Wi-Fi communication between a WD and the PFs it is directly connected with during docking is protected for privacy and integrity. Also other WDs that may have previously been connected with these PFs cannot decrypt this communication or tamper with it without detection. The communication between a WDH and a Wi-Fi connected PF is protected for privacy and integrity. Also WDs cannot decrypt this communication or tamper with it without detection, although the WD that is docked with this WDH will receive some of this communication from the WDH and some of this communication originated from the WD that is docked with this WDH. A WD that is allowed to dock more than once has to perform WSC only once when it docks for the first time and can dock without using WSC when it docks again. A WD and WDH can both be pre-configured such that the WD can always dock automatically.

In the example enhanced wireless docking system the following phases are defined: set-up (or configuration) phase, undocked mode, docking phase, and undocking phase, either controlled or uncontrolled.

In a Set-up phase a WDH sets itself up as a P2P GO for a P2P Group G1 with SSID SSID1 and Passphrase PP1. The WDH accepts only PFs for joining G1. A number of PFs join G1 using PBC or WSC-PIN for obtaining PP1. The PFs may also be pre-configured for SSID1 and PP1.

In Undocked mode the WDH sets itself up as a P2P GO for a P2P Group G2 with SSID SSID2 but does not decide on a pass phrase yet for G2. The WDH may send Beacon frames for G2. The WDH responds to Probe Request frames. The WDH gives information that it is a WDH, on its PFs, on its WDEs, etc. in the relevant Information Elements. The WDH accepts only WDs for joining G2.

In a Docking phase a WD that has discovered G2 asks to join G2. This triggers the docking action. If the WD is not allowed to dock, the requested docking action is refused. If the WD has docked before and if that WD is allowed to dock again, the WDH sets as pass phrase PP2 for G2 the pass phrase that it has used before with that WD. In all other cases (so when the WD has never docked before, or when it has docked before but was allowed to dock only once), the WDH generates a new random PP2 as pass phrase for G2. The WDH sends SSID2, PP2, the WD address and WD ID to all PFs using P2P Group G1 (so encrypted with a key derived from PP1 and therefore kept private for all WDs and all other devices). If the WD is pre-configured with a pass phrase for this WDH or still possesses a pass phrase from a previous docking session, it may try and use that pass phrase in a four-way handshake. Otherwise, or when using the old pass phrase fails, the WD performs WSC for P2P Group G2 with the WDH for obtaining PP2. WSC may use PBS, or WSC-PIN using either the WD or WDH PIN.

If after joining G2, no PF is going to be connected directly to the WDH, the WD and WDH set up a payload connection through the WDH to PFs and the WD is docked.

If one or more PFs are going to be connected directly to the WD, the WD exchanges GO role with the WDH. The WDH sends the addresses/IDs of all PFs that support setting up a direct Wi-Fi connection to the WD. It may exclude the addresses of PFs for which the payload connection is best routed through the WDH for some reason. We call these the 'direct' PFs. All other PFs are called the 'indirect' PFs. Using P2P Group G1 as the communication means, the WDH asks the direct PFs to join P2P Group G2 using the pass phrase PP2. Effectively in this example the second secret data equals the third secret data. Since the direct PFs now know PP2, they do not need to perform WSC to join G2, which saves considerable time, even if e.g. PINs are pre-provisioned. These PFs simply execute the four-way handshake with the WD using the pass phrase that they know (PP2). The WD has obtained the addresses of the direct PFs involved so knows which ones to expect for connection. Both the WD, through G2, and the PFs, through G1, can signal to the WDH that P2P Group G2 joins have succeeded or failed. A PF may fail to join P2P Group G2 e.g. if the distance between the PF and the WD is too large. The direct PFs for which joining failed become indirect PFs and remain connected to the WDH. The WD sets-up direct payload connections for PFs that have joined G2 successfully (i.e. the direct PFs). These payload connections are protected using a key derived from PP2. The WD and WDH set up a payload connection through the WDH to the other PFs (i.e. the indirect PFs), and the WD is docked. If the WDH supports more than one WD simultaneously, it may set up a new SSID to accept a new WD for docking.

In an Undocking phase undocking may be done in a controlled or uncontrolled way. Controlled docking is whereby the WD indicates to the WDH that it wants to undock. Uncontrolled undocking is when the WDH detects somehow that the WD has left or became unreachable without having received an indication from the WD that it wants to undock.

During Controlled Undocking, when a WD wants to undock, it sends the WDH a message using P2P Group G2 as the communication means that it wants to undock. The WDH acknowledges the successful reception of this message. After successful delivery of that message, the WD shall end the P2P Group G2 session by sending the WDH and PFs in G2 De-authentication frames with reason code 3. Upon the reception of the De-authentication frame, the PFs tear down the payload connections. Using P2P Group G1 as the communication means, the WDH instructs the direct PFs to delete the used PP2. Alternatively, it may only do this if the WD is not allowed to dock again. In this case, the PFs have to store pass phrase and WD ID combinations for later use for the WDs that are allowed to dock again. This may save some time during the docking operation. The WDH has to keep track though of which PF has received which pass phrases. The WDH instructs the indirect PFs to tear down the payload connections. The WDH assumes the GO role again of P2P Group G2 and sets the passphrase to undecided. The WDH may now advertise the undocked state again.

During Uncontrolled Undocking the WDH somehow decides that the WD has left or became unreachable without having received an indication from the WD that it wants to undock. The WDH informs all PFs to tear down the (direct or indirect) payload connections. Using P2P Group G1 as the communication means, the WDH instructs the direct PFs to delete the used PP2. Alternatively, it may only do this if the WD is not allowed to dock again. In this case, the PFs have to store pass phrase and WD ID combinations for later use for the WDs that are allowed to dock again. This may save some time during the docking operation. The WDH has to keep track though of which PF has received which pass phrases. The WDH assumes the GO role again of P2P Group G2 and sets the passphrase to undecided. The WDH may now advertise the undocked state again.

Although the invention has been mainly explained by embodiments using wireless docking, the invention is also suitable for any wireless system where an unconnected wireless device needs to connect to a group of devices. The invention is relevant to Wi-Fi Docking enabled devices, Wi-Fi Serial Bus devices, Wi-Fi Display devices, and any other devices supporting Wi-Fi Direct ranging from portable audio devices, mobile phones, laptops, tablets to Wi-Fi mice, keyboards, display devices, printers, cameras.

It is to be noted that the invention may be implemented in hardware and/or software, using programmable components. A method for implementing the invention has the steps corresponding to the functions defined for the system as described with reference to FIG. 1.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A system for wireless communication comprising:
   a group of wireless devices and a portable device, each wireless device of the group and the portable device comprising a radio transceiver for wirelessly exchanging data; wherein, a first wireless device of the group accommodating a first host function and a second wireless device of the group accommodating a second host function, the first and second wireless devices being the same wireless device or different wireless devices;

the group sharing first secret data and configured for wireless communication with the first wireless device accommodating the first host function via respective first secure connections based on the first secret data;

the portable device comprising a device communication processor configured for setting up a second secure connection with the second wireless device accommodating the second host function using a pairing procedure based on second secret data different from the first secret data, receiving a second instruction via the second secure connection, and setting up, according to the second instruction, a respective direct wireless secure connection with at least one wireless device of the group using a respective pairing procedure based on third secret data, the third secret data differing from the first secret data;

the second wireless device accommodating the second host function comprising a host communication processor configured for setting up the second secure connection with the portable device using the pairing procedure based on the second secret data, transferring to the at least one wireless device via the first secure connection a first instruction to apply the third secret data for setting up a direct wireless secure connection with the portable device, and transferring to the portable device via the second secure connection a second instruction to apply the third secret data for setting up the direct wireless secure connection with the at least one wireless device based on the third secret data; and the at least one wireless device comprising a communication processor configured for receiving the first instruction via the first secure connection, and setting up, according to the first instruction, the respective direct wireless secure connection with the portable device using a respective pairing procedure based on the third secret data.

2. A portable device for wireless communication in a system including a group of wireless devices and the portable device, each wireless device of the group and the portable device configured for wirelessly exchanging data, and the group sharing first secret data and configured for wireless communication with a first wireless device of the group via respective first secure connections based on the first secret data, the portable device comprising:

a radio transceiver for wirelessly exchanging data; and a device communication processor configured for setting up a second secure connection with a second wireless device of the group accommodating a host function by using a pairing procedure based on second secret data different from the first secret data;

receiving an instruction via the second secure connection; and setting up, according to the instruction, a respective direct wireless secure connection with at least one wireless device of the group using a respective pairing procedure based on third secret data, the third secret data differing from the first secret data.

3. The device as claimed in claim 2, wherein the device communication processor is further configured for one or more of:

controlling communication via the respective direct wireless connection as a group owner; or setting up respective different direct wireless secure connections with respective wireless devices of respective different subsets using a respective pairing procedure based on respective different third secret data, or generating the third secret data and transferring the third secret data to the second wireless device accommodating the host function.

4. The device as claimed in claim 2, wherein the device communication processor is configured for one or more of:

disconnecting the second secure connection before initiating setting up the respective direct wireless secure connection with the at least one wireless device; or providing a persistent grouping, and accordingly for, after disconnecting the respective direct wireless secure connection based on said third secret data, setting up a further respective direct wireless secure connection based again on said third secret data, or using the second secret data or the third secret data acquired during earlier pairing when, after disconnecting the respective direct wireless secure connection based on said third secret data, reconnecting with the at least one wireless device for setting up a respective direct wireless secure connection.

5. The device as claimed in claim 2, wherein the second secure connection comprises a Wi-Fi Direct P2P connection, or the respective direct wireless secure connection comprises a Wi-Fi Direct Peer to Peer connection, or the respective direct wireless secure connection comprises a Tunneled Direct Link Setup connection, or the pairing procedure comprises a Wi-Fi Protected Access procedure or a Wi-Fi Simple Configuration procedure.

6. A host device for wireless communication in a system including a group of wireless devices and a portable device, each wireless device of the group and the portable device configured for wirelessly exchanging data, and the group sharing first secret data and configured for wireless communication with a first wireless device of the group via respective first secure connections based on the first secret data, the host device comprising:

a radio transceiver for wirelessly exchanging data; and a host communication processor configured for accommodating a host function by setting up a second secure connection with the portable device using a pairing procedure based on second secret data different from the first secret data, transferring to at least one wireless device of the group via the first secure connection a first instruction to apply third secret data for setting up a direct wireless secure connection with the portable device, the third secret data different from the first secret data, and transferring to the portable device via the second secure connection a second instruction to apply the third secret data for setting up the direct wireless secure connection with the at least one wireless device of the group based on the third secret data.

7. The host device as claimed in claim 6, wherein the host communication processor is configured for one or more of:

generating the third secret data, or generating a respective, different set of the third secret data for respective, different instances of the portable device, or generating a respective, different set of the third secret data when the portable device, after having disconnected the second secure connection, is setting up the second secure connection a respective, further time, or generating a respective, different set of the third secret data for a respective, different subset of the wireless devices, or generating the third secret data based on, or equal to, the second secret data.

8. The host device as claimed in claim 6, wherein the host communication processor is configured for one or more of:

assigning a limited lifetime to the third secret data, or assigning a lifetime to the third secret data depending on an authorization level of the device.

9. The host device as claimed in claim 6, wherein the host communication processor is configured for:

transferring a third instruction to the at least one wireless device for disconnecting the first secure connection before setting up the direct wireless secure connection to the portable device.

10. The host device as claimed in claim 6, wherein the host device is a wireless docking host or a wireless docking station.

11. A wireless device for wireless communication in a system including a group of wireless devices and a portable device, each wireless device of the group and the portable device configured for wirelessly exchanging data, and the group sharing first secret data and configured for wireless communication with a first wireless device of the group via respective first secure connections based on the first secret data and a second wireless device setting up a second secure connection with the portable device using a pairing procedure based on the second secret data, the wireless device comprising:

a radio transceiver for wirelessly exchanging data; and a communication processor configured for receiving a first instruction via the first secure connection, the first instruction to apply third secret data for setting up a direct wireless secure connection with the portable device, and setting up, according to the first instruction, the direct wireless secure connection with the portable device using a pairing procedure based on the third secret data.

12. The wireless device as claimed in claim 11, wherein the communication processor is configured for:

initiating the setting up of the direct wireless secure connection to the portable device.

13. The wireless device as claimed in claim 11, wherein the communication processor is configured for one or more of:

disconnecting the first secure connection before setting up the direct wireless secure connection to the portable device, or restoring the respective first secure connection after disconnecting the respective direct wireless secure connection to the portable device.

14. A method of wireless communication in a system including a group of wireless devices and a portable device, each wireless device of the group and the portable device configured for wirelessly exchanging data, and the group sharing first secret data and configured for wireless communication with a first wireless device of the group via respective first secure connections based on the first secret data, the method comprising setting up a second secure connection between the portable device and a second wireless device of the group accommodating a second host function using a pairing procedure based on second secret data different from the first secret data;

transferring to at least one wireless device of the group via the first secure connection a first instruction to apply a third secret data for setting up a direct wireless secure connection with the portable device, the third secret data differing from the first secret data, and transferring to the portable device via the second secure connection a second instruction to apply the third secret data for setting up the direct wireless secure connection with the at least one wireless device based on the third secret data;

setting up a respective direct wireless secure connection between the portable device and the at least one wireless device using a respective pairing procedure based on the third secret data.

15. A non-transitory computer readable medium comprising a program operative to cause a processor to perform the method as claimed in claim 14.

* * * * *